US012786063B2

(12) United States Patent
Venkataramu et al.

(10) Patent No.: US 12,786,063 B2
(45) Date of Patent: Nov. 3, 2026

(54) NETWORK SLICING POLICY FOR MOBILE DEVICE MANAGEMENT SYSTEMS

(71) Applicant: Verizon Patent and Licensing Inc., Basking Ridge, NJ (US)

(72) Inventors: Praveen Venkataramu, Raritan, NJ (US); Umesh Kumar Gupta, Morris Plains, NJ (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 118 days.

(21) Appl. No.: 18/766,973

(22) Filed: Jul. 9, 2024

(65) Prior Publication Data

US 2026/0019335 A1 Jan. 15, 2026

(51) Int. Cl.

| | |
|---|---|
| ***G06F 15/177*** | (2006.01) |
| ***H04L 41/0894*** | (2022.01) |
| ***H04L 41/0895*** | (2022.01) |
| ***H04L 41/5003*** | (2022.01) |

(52) U.S. Cl.
CPC ...... *H04L 41/0894* (2022.05); *H04L 41/0895* (2022.05); *H04L 41/5003* (2013.01)

(58) Field of Classification Search
CPC ............. H04L 41/0894; H04L 41/0895; H04L 41/5003
See application file for complete search history.

(56) References Cited

U.S. PATENT DOCUMENTS 10,440,558 B1 * 10/2019 De Figueiredo Junior ................ H04W 12/35
2017/0048713 A1 * 2/2017 Guday .................. H04W 12/35
2025/0024258 A1 * 1/2025 Stammers ........... H04W 12/069

* cited by examiner

*Primary Examiner* — Joseph R Maniwang

(57) ABSTRACT

Systems and methods provide an assisted slice profile service. A network device receives an order for an enterprise subscription. The network device generates, based on the order, a slicing policy configuration file for user equipment (UE) devices associated with the enterprise subscription. The network device sends the slicing policy configuration file to an enterprise for importation and enforcement by a Mobile Device Management (MDM) system.

20 Claims, 6 Drawing Sheets

300

| Rule ID (305) | MDN (310) | OS Platform Type (320) | MCC (330) | MNC (340) | Policy Type (350) | Restrictions (360) | Traffic Descriptor (Slice Identification) (370) |
|---|---|---|---|---|---|---|---|
| 01 | [Default/ Mdn list] | Android | 555 | 888 | WorkProfile | None | Type: AppID<br>Value: Enterprise |
| 02 | [Mdn list] | Android | 555 | 888 | Category | ["Communications", "Productivity"] | Type: AppID<br>Value: Enterprise1 |
| 03 | [Mdn list] | Android | 555 | 888 | Application | ["com.cisco.wx2.android", "us.zoom.videomeetings.android"] | Type: AppID<br>Value: Enterprise2 |
| 04 | [Default/ Mdn list] | iOS | 555 | 888 | Category | ["Communications", "Productivity"] | Type: DNN<br>Value: eMBBMobilePremium |
| 05 | [Mdn list] | iOS | 555 | 888 | Application | ["com.cisco.wx2.ios", "us.zoom.videomeetings.ios"] | Type: DNN<br>Value: eMBBMobilePremium |
| 06 | [Mdn list] | Windows | 555 | 888 | Application | ["com.cisco.wx2.win", "us.zoom.videomeetings.win"] | Type: DNN<br>Value: eMBBMobilePremium |

380

•
•
•

FIG. 3

NETWORK SLICING POLICY FOR MOBILE DEVICE MANAGEMENT SYSTEMS

BACKGROUND INFORMATION

Next Generation mobile networks, such as Fifth Generation (5G) mobile networks, may incorporate "network slicing" technology to increase network efficiency and performance. Network slicing is a type of virtualized networking architecture that involves partitioning of a single physical network into multiple virtual networks. The partitions, or "slices," of the virtualized network may be customized to meet the specific needs of applications, services, devices, customers, or operators. Each network slice can have its own architecture, provisioning management, and security that supports a particular application or service.

BRIEF DESCRIPTION OF THE DRAWINGS

FIG. 3 is a tabling illustrating exemplary fields for a slicing policy configuration file, according to an implementation;

DETAILED DESCRIPTION

Figure 1:
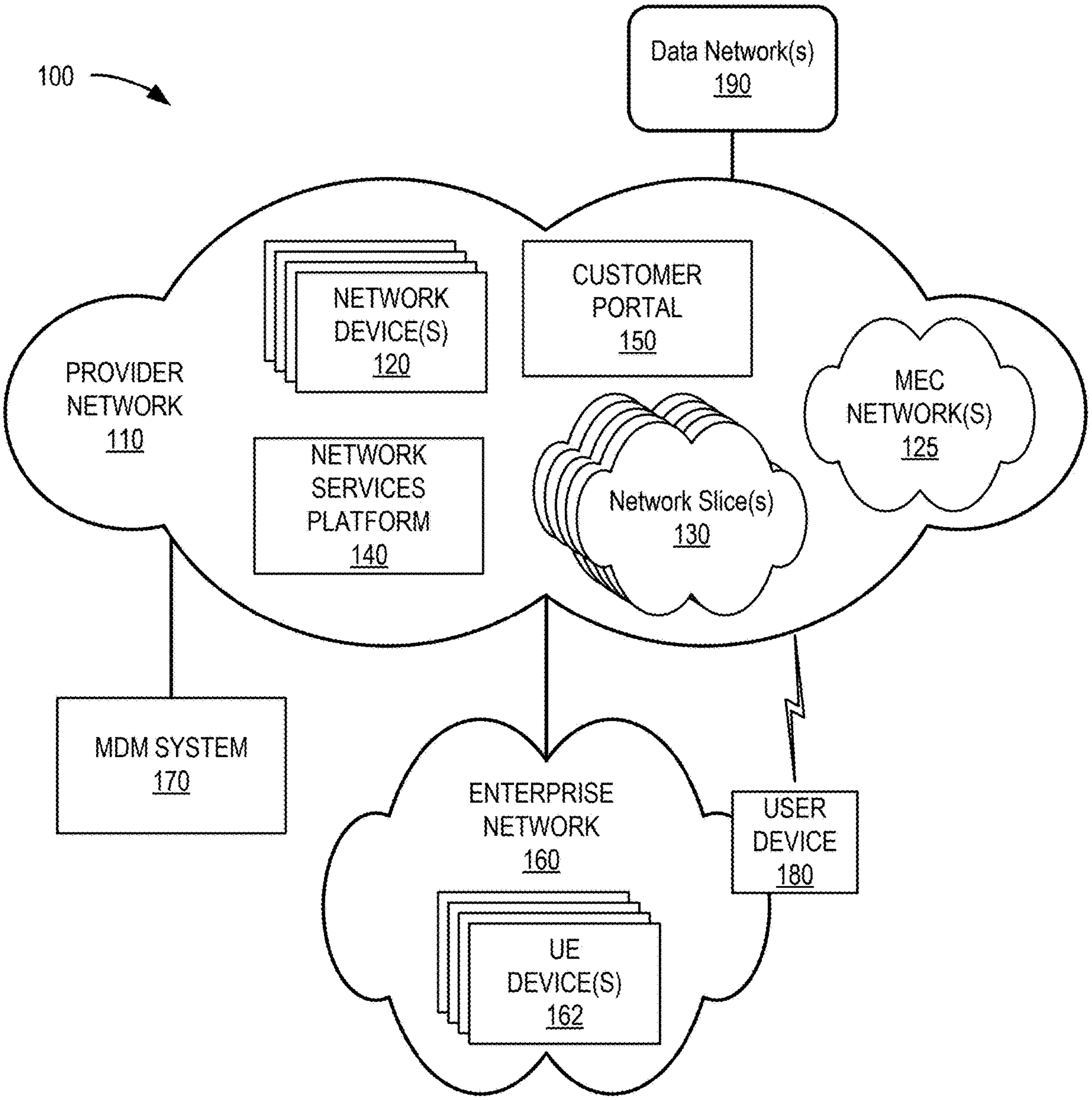
FIG. 1 illustrates an exemplary network environment in which the systems and methods for providing an assisted slice profile service may be implemented.

The following detailed description refers to the accompanying drawings. The same reference numbers in different drawings may identify the same or similar elements. Also, the following detailed description does not limit the invention.

User equipment (UE) devices may execute various applications that generate network traffic with different service requirements. These different service requirements may be met through network slicing. A network slice refers to a complete logical network that includes components, of an access network (e.g., a Radio Access Network (RAN)) and core network, which provide certain telecommunication services and network capabilities that can vary from slice to slice. Bandwidth, capacity, and connectivity functions are allocated within each network slice to meet the requirements of the network slices. Selection of network slices for a particular application can thus have significant impact on network performance and user experience.

The advent of Fifth Generation (5G) technology has enabled the possibility of creating Service Level Agreement (SLA)-based prioritized service via network slicing. Considering the network slicing offerings may be an SLA-based service for specialized use cases, the resources dedicated by the network for network slices are limited in nature. Thus, network slicing resources should be protected by ensuring that a network slice is used only by services that can benefit from the enhanced service available via the network slice.

Mobile Device Management (MDM) systems can be used to control, secure and enforce policies on UE devices and other endpoints in enterprise networks. MDM is sometimes provided as a third-party service to optimize the functionality and security of UE devices within the enterprise while protecting the enterprise network. For example, MDM allows network administrators to manage all endpoint devices (e.g., UE devices) from a single console.

Enablement of network slicing relies on non-network entities (e.g., a device, operating system (OS), or MDM solution). From a Mobile Network Operator (MNO) perspective, the inclusion of non-network entities presents a great challenge in ensuring that all entities are synchronized with each other for the common objective of avoiding wasting limited network resources. For example, an OS-based implementation may allow any MDM solution provider to enable any application access to a network slice. Such a flexible implementation could lead to an MDM administrator assigning a network slice for an application that may not benefit from the level of service afforded by the network slice. Furthermore, per a contractual agreement, the MNO may expect an enterprise administrator to use a network slice for specific applications only. It may be challenging for the enterprise administrator to enforce the contract, as the MDM administrator can assign a network slice to an application that may not be contractually authorized to use it.

Systems and methods described herein provide an assisted slice profile service that simplifies selection and assignment of network slices by MDM systems. In one implementation, the systems and methods utilize a slicing policy configuration file that can be provided from a MNO to an enterprise customer. The slicing policy configuration file reflects slice attributes to support a subscription purchased by the enterprise customer. The slicing policy configuration file can be transferred from the enterprise customer to an MDM provider for importing rules into the customer's MDM solution.

Providing the slicing policy configuration file to the MDM provider gives a single source from which policy can be imported and ensures that an enterprise customer is meeting contractual obligations to their subscription with the MNO. The MNO is assured that the mobile network will only encounter the traffic it planned for and can ensure that agreed SLAs are met. Furthermore, the MDM administrators are able to set and enforce slicing rules without detailed knowledge of a MNO's traffic descriptor values.

FIG. 1 is a diagram of an exemplary environment 100 in which the systems and/or methods, described herein, may be implemented. As shown in FIG. 1, environment 100 may include a provider network 110 that provides services to devices in an enterprise network 160. Environment 100 may also include an MDM system 170 (also referred to as an MDM solution), a user device 180, and one or more data networks 190. According to other embodiments, environment 100 may include additional networks, fewer networks, and/or different types of networks than those illustrated and described herein.

Environment 100 includes links between the networks and between the devices. Environment 100 may be implemented to include wired, optical, and/or wireless links among the devices and the networks illustrated. A communication connection via a link may be direct or indirect. For example, an indirect communication connection may involve an intermediary device and/or an intermediary network not illustrated in FIG. 1. Additionally, the number and the arrangement of links illustrated in environment 100 are exemplary.

Provider network 110 may generally include one or more wired, wireless and/or optical networks that are capable of receiving and transmitting data, voice and/or video signals. For example, provider network 110 may include one or more access networks, IP multimedia subsystem (IMS) networks, core networks, or other networks. The access networks may include a wireless communications network (e.g., a Radio Access Network (RAN)) that connects users/customers (e.g., using UE devices 162 and user device 180) to other portions of provider network 110 (e.g., a core network). In one example, the access network may include a 5G access network and/or a long-term evolution (LTE) access network. Provider network 110 may further include one or more satellite networks, one or more packet switched networks, such as an IP-based network, a local area network (LAN), a wide area network (WAN), a personal area network (PAN) (e.g., a wireless PAN), a wireless local area network (WLAN), an intranet, or another type of network that is capable of transmitting data. In an exemplary implementation, provider network 110 may represent a network associated with a service provider that provides various services, such as IP-related services, value added services, etc.

In the example of FIG. 1, provider network 110 may include network devices 120. Each network device 120 may be configured to perform network functions in provider network 110. For example, network device 120 may include a switch, a router, a firewall, a gateway, a Network Address Translation (NAT) device, a Reconfigurable Optical Add-Drop Multiplexer (ROADM), and/or another type of network device. Some or all of the functionality of network device 120 may be virtualized as a Virtualized Network Function (VNF) in provider network 110. Depending on the implementation, network 110 may include other types of network devices 120, such as, for example, a base station (e.g., a next-generation NodeB (gNB), an evolved NodeB (eNB), etc.), a gateway device, a support node, a serving node, a core access and mobility management function (AMF), a session management function (SMF), a policy control function (PCF), as well other network devices that provide various network-related functions and/or services, such as charging and billing, security, authentication and authorization, network policy enforcement, management of subscriber profiles, and/or other functions and/or services that facilitate the operation of the core network. Network devices 120 may receive, store, and enforce policies for UE devices 162 in enterprise network 160 and other user devices (e.g., user device 180). According to implementations describe herein, provider network 110 may also include Multi-Access Edge Computing (MEC) network 125 and one or more network slices 130.

MEC network 125 may include one or more configurable devices to provide MEC services to enterprise network 160 and/or UE devices 162. MEC network 125 may include, for example, configurable network devices located at a network edge to provide low-latency services to UE devices. A MEC service may include, for example, a low-latency microservice associated with a particular application, such as, for example, a user authentication microservice, a navigation microservice, an online shopping microservice, data compression microservice, a content delivery microservice, a gaming microservice, a virtual and/or augmented reality microservice, a health monitoring microservice, and/or another type of microservice associated with a low latency requirement. As another example, a MEC microservice may include a microservice associated with a VNF of provider network 110.

Portions of provider network 110 may be configured as network slices 130. Each network slice of network slices 130 may include a logical end-to-end network, which may run on a shared physical infrastructure, that is created to serve a particular purpose and/or service data traffic with a particular set of performance parameters or characteristics. For example, each of network slices 130 may service a particular service type and/or may satisfy or meet particular performance characteristics or parameters for sessions served by the network slice. In some implementations, each network slice 130 may have a different Slice/Service Type (SST), such as, for example, an enhanced Mobile Broadband (eMBB) SST, an Ultra Reliable Low Latency Communications (URLLC) SST, or a Massive Internet of Things (mIoT) SST. Each network slice may, however, have a different SST not described herein. In other implementations, each type of network slice 130 may be identified by a traffic descriptor.

According to implementations describe herein, provider network 110 may also include a network services platform 140 and a customer portal 150. Network services platform 140 and a customer portal 150 may include network devices to implement the assisted slice profile service described herein. More particularly, network services platform 140 and customer portal 150 may provide a slicing policy configuration file that enables the assisted slice profile service.

Network services platform 140 may perform functions to configure available network services for customers (e.g., customers using enterprise network 160, UE device 162, etc.). Network services platform 140 may include components to receive work orders and to provision network services. According to implementations described herein, network services platform 140 may assist customer portal 150 in generating a slicing policy configuration file for the assisted slice profile service.

Customer portal 150 may include network devices that provide a web-based interface for a customer (e.g., using user device 180) to order services, such as services for UE devices 162 that may be supported by network slicing. Via user device 180, a user (e.g., an enterprise network administrator) may access customer portal 150 to order and/or upgrade service level configurations/policies for UE devices 162 associated with enterprise network 160. For example, using customer portal 150, user may subscribe to network service levels and/or quality of service (QoS) levels that provider network 110 will provide for designated applications, designated types of applications, or all data services for UE devices 162.

Enterprise network 160 (also referred to as a "customer network") may include a network that receives services from provider network 110. Enterprise network 160 may include a local area network (LAN), a WAN, or a combination of networks that provide network access to devices in provider network 110. In one implementation, enterprise network 160 may include a network interconnecting one or more UE devices 162. In another implementation, provider network 110 may provide mobility services for UE devices 162 (e.g., when a UE device 162 is outside of enterprise network 160). In another implementation, enterprise network 160 may include gateway (GW) routers (e.g., customer premises equipment) that act as a secure gateway for devices within enterprise network 160. In still another implementation, enterprise network 160 may utilize deployed network functions in MEC network 125.

UE devices 162 (also referred to as enterprise devices 162) may include devices that are managed by enterprise network 160 and have subscriptions for accessing provider network 110. UE devices 162 may include mobile devices (e.g., smart phones, tablets, etc.), devices providing data services (e.g., personal computers, workstations, laptops, etc.), devices providing voice services (e.g., telephones), and/or devices providing video services (e.g., televisions, set-top boxes, etc.). UE devices 162 may include an operating system (OS) (e.g., Windows, iOS, Linux, Android, etc.) that includes distinct protocols and interfaces. According to an implementation, UE device 162 may also include an MDM agent (also referred to as an MDM client), which includes software to enforce policies from MDM system 170 on UE device 162.

MDM system 170 may include one or more computing devices or systems that act as a backend for enterprise network 160. MDM system 170 may perform software and/or data administration functions on UE devices 162, such as installing, removing, or updating software and/or data on UE devices 162, configure UE devices 162 (e.g., change device settings, etc.), etc. For example, MDM system 170 may include one or more devices configured for creation, download, remote management (e.g., enable, disable, update, and delete), and/or security of MNO policies. A network administrator may configure policies through an MDM workstation (such as an MDM server's management console), and the MDM system 170 may push the policies to the MDM client on each UE device 162. Depending on the implementation, MDM system 170 may be hosted on other portions of provider network 110, a data network, or a third-party network.

User device 180 may include a computational or communication device that is capable of communicating with provider network 110. In one aspect, user device 180 may be used by a customer (e.g., a network administrator of enterprise network 160) to communicate with customer portal 150 or interact with devices in enterprise network 160. User device 180 may include, for example, a personal communications system (PCS) terminal (e.g., a smartphone that may combine a cellular radiotelephone with data processing and data communications capabilities), a tablet computer, a personal computer, a laptop computer, a gaming console, an Internet television, or other types of computation or communication devices.

Data network 190 may include, for example, a packet data network. In an implementation, UE devices 162 may connect to data network 190 via provider network 110. Data network 190 may also include and/or be connected to a LAN, a WAN, a MAN, an autonomous system (AS) on the Internet, an optical network, a cable television network, a satellite network, a wireless network, an ad hoc network, a telephone network (e.g., the PSTN or a cellular network), an intranet, or a combination of networks. Although a single data network 190 is shown in FIG. 1 for simplicity, in practice there may be numerous data networks 190 which may be connected with a UE device 162 at the same time via different sessions and/or different network slices.

According to implementations described herein, an administrator for enterprise network 160 (e.g., using user device 180) may use customer portal 150 to order/purchase network slicing for enterprise devices 162. Based on the customer order, network services platform 140 may generate a slicing policy configuration file that reflects slice attributes for the order. Customer portal 150 may provide the slicing policy configuration file to the administrator for enterprise network 160. MDM system 170 may obtain the slicing policy configuration file from enterprise network 160 and, based on the slicing policy configuration file, assign a slice to an application that is consistent with the customer order.

Although FIG. 1 shows exemplary components of environment 100, in other implementations, environment 100 may include fewer components, different components, differently-arranged components, or additional components than depicted in FIG. 1. Additionally, or alternatively, one or more components of environment 100 may perform functions described as being performed by one or more other components of environment 100.

Figure 2:
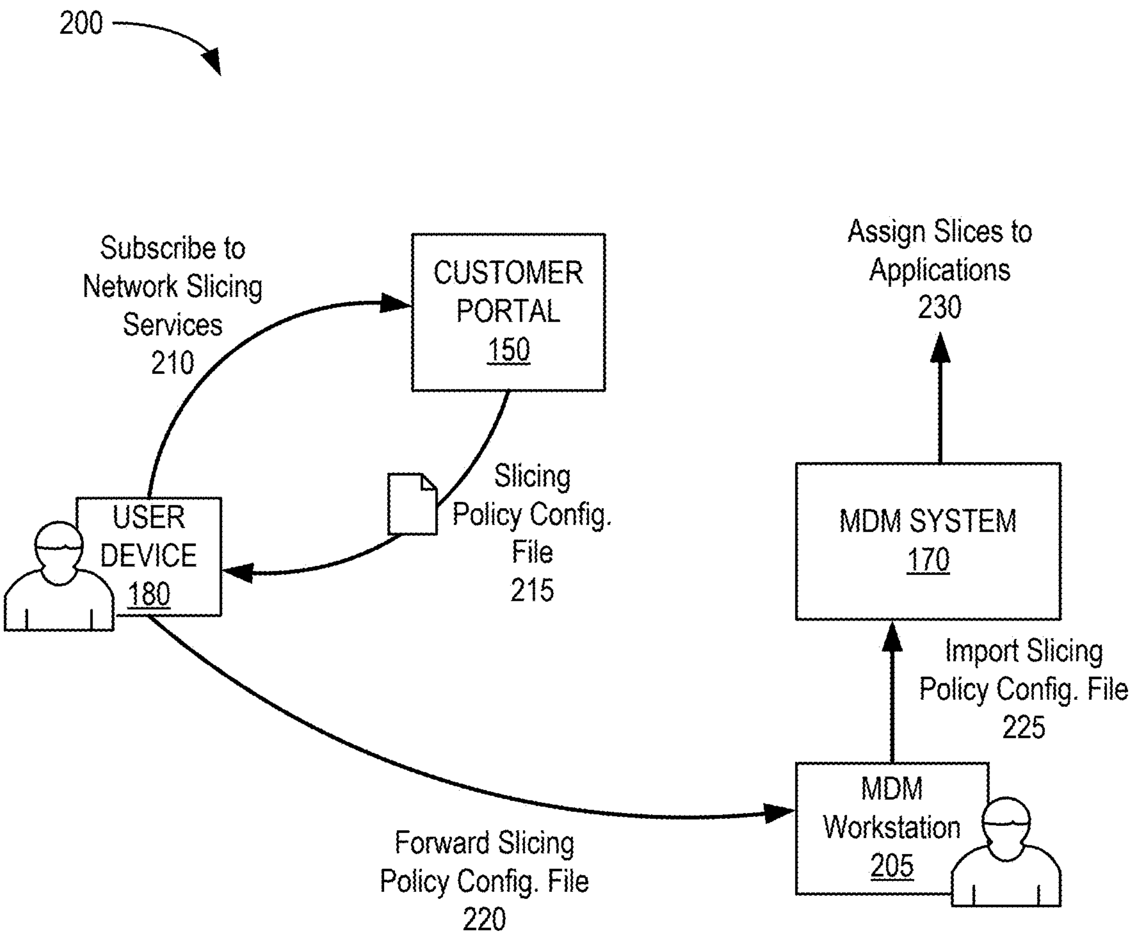
FIG. 2 illustrates communications for providing the assisted slice profile service in a portion of a network environment.

FIG. 2 is a diagram illustrating communications, in a portion 200 of network environment 100, to implement an assisted slice profile service. As shown in FIG. 2, network portion 200 may include customer portal 150, MDM system 170, user device 180, and an MDM workstation 205. FIG. 2 provides simplified illustrations of communications in network portion 200 and are not intended to reflect every signal or communication exchanged between devices/functions.

User device 180 may be used, for example, by a network administrator for enterprise network 160. MDM workstation 205 may be a user device or another type of computing device that allows an MDM administrator to communicate with user device 180 and import files to MDM system 170.

As indicated at reference 210, an administrator for enterprise network 160, using user device 180, may access customer portal 150 to subscribe to network services for UE devices 162 (not shown in FIG. 2). In one implementation, customer portal 150 may provide a user interface to assign service levels to UE devices 162. For example, after a login to an account with the MNO of provider network 110, the administrator may use customer portal 150 to select a service level for enterprise traffic, particular applications, traffic categories, etc., for UE devices 162.

Based on the subscription order from user device 180, customer portal 150 may provide a slicing policy configuration file 215 to user device 180. Slicing policy configuration file 215 may reflect slice attributes to support a subscription purchased by the enterprise customer. Slicing policy configuration file 215 may be created, for example, by network services platform 140 (not shown in FIG. 2) based on the enterprise customer's subscription to network-slice-supported services that are bound to terms and conditions as set by the MNO for MDM system 170 to apply. In one implementation, slicing policy configuration file 215 may be provided in a standardized format that can be generated by any MNO and understood by any MDM solution. An example of fields that may be included in slicing policy configuration file 215 is shown in FIG. 3.

Referring to FIG. 3, an exemplary table 300 is provided to illustrate fields for slicing policy configuration file 215. As shown in FIG. 3, table 300 includes a rule identifier (ID) field 305, a Mobile Directory Number (MDN) field 310, an OS platform type field 320, a Mobile Country Code (MCC) field 330, a Mobile Network Code (MNC) field 340, a policy type field 350, a restrictions field 360, a traffic descriptor field 370, and a variety of entries 380 for fields 305 through 370.

Rule ID field 305 may provide an identifier for a particular rule (e.g., "01", "02", "03", etc.), as defined by the collection/row of corresponding entries in fields 310 through 370. MDN field 310 may identify one or more MDNs (or another UE device identifier) to which the attributes corresponding to rule ID field apply. More particularly, an enterprise customer may purchase network slicing services for one or more MDNs. In one implementation, an entry 380 for MDN field 310 may include a "default" designation, such that customer MDNs that are not otherwise listed may receive policy treatment for a default rule with the appropriate OS type.

OS platform type field 320 may indicate an OS type (e.g., Android, IOS, etc.) implemented on UE devices 162. MCC field 330 and MNC field 340 may include numbers and/or alphanumeric sequences (i.e., "555" and "888") that uniquely identify a network (e.g., provider network 110) and its home network subscribers. In another implementation, MCC field 330 and MNC field 340 may be combined into a Public Land Mobile Network (PLMN) ID of provider network 110.

Policy type field 350 may indicate one of multiple use cases that may be associated with restrictions indicated in restrictions field 360. For example, policy type field 350 may include one of a work profile, an application category, or an application ID. A "work profile" entry in policy type field 350 may indicate, for example, that all applications/traffic associated with UE device 162 are assigned to a designated slice. If a "WorkProfile" policy type rule is present, no other policy type records would need to be listed in the slicing policy configuration file, since all traffic would default to the slice designated for the work profile. Thus, in the example, of FIG. 3, the "WorkProfile" policy type for rule ID "01" has no restrictions listed in restrictions field 360. Subsequent policies in FIG. 3 (i.e., rule IDs 02 through 05) may not be compatible with rule ID 01 but are shown for illustration.

A "category" entry in policy type field 350 may indicate, for example, that only specific categories of applications are assigned to a particular network slice. In the example of FIG. 3, restrictions field 360 may be used to indicate the specific application categories for which access to the network slice is permitted (e.g., "communication" category, "productivity" category, etc.).

An "application" entry in policy type field 350 may indicate, for example, that only specific application(s), as identified by a platform-specific unique application and/or bundle ID, are assigned to a particular network slice. In the example of FIG. 3, restrictions field 360 may be used to indicate the specific application identifiers for which access to the network slice is permitted (e.g., "com.cisco.wx2.android", "us.zoom.videomeetings.android", etc.).

Traffic descriptor field 370 may indicate an OS-platform-specific value that the network (i.e., provider network 110) maps to specific slice type via an OS exposed Application Programming Interface (API). Traffic descriptor field 370 may include a traffic descriptor type and a descriptor value. For example, the traffic descriptor type in traffic descriptor field 370 may be used for OS API, while the value in traffic descriptor field 370 may indicate a slice category. The value may identify, for example, a slice that is capable of supporting eMBB traffic, URLLC traffic, Time Sensitive Network (TSN) traffic, MIOT traffic, Vehicle-to-Everything (V2X) traffic, High-performance Machine Type Communication (HMTC) traffic, and other customized traffic, for example.

Although FIG. 3 shows exemplary fields that may be provided in slicing policy configuration file 215, in other implementations, slicing policy configuration file 215 may contain fewer, different, differently-arranged, or additional fields than depicted in FIG. 3. Also, in other implementations, information in table 300 may be provided in a different format, such as a text file, a Java Script Object Notation (JSON) file, an Extensible Markup Language (XML) file, a YAML file, a database file, etc. For example, designated fields shown in table 300 may be replaced with a flat file structure with strings of features and settings in place of designated fields.

Returning to FIG. 2, slicing policy configuration file 215 may be received by user device 180 and the enterprise administrator may forward 220 the slicing policy configuration file 215 to the MDM workstation 205 for an MDM administrator. As shown at reference 225, the MDM administrator may import slicing policy configuration file 215 into MDM system 170. In one implementation, MDM system 170 may include a user interface to import slicing policy configuration file 215. In another implementation, slicing policy configuration file 215 may be detected and pulled by MDM system 170. There may be multiple other ways in which slicing policy configuration file 215 may be transferred to MDM system 170, some of which may bypass MDM workstation 205. For example, MDM system 170 may include a dedicated interface to receive and detect slicing policy configuration file 215.

MDM system 170 may import slicing policy configuration file 215 and extract the respective policies for enterprise network 160/UE devices 162. Based on the policy, MDM system 170 may assign a slice to an application, application group, or work flow. The slicing policy configuration file 215 ensures that the slice assignment by MDM system 170 is consistent with expectations of provider network 110 to support the enterprise subscription.

Figure 4:
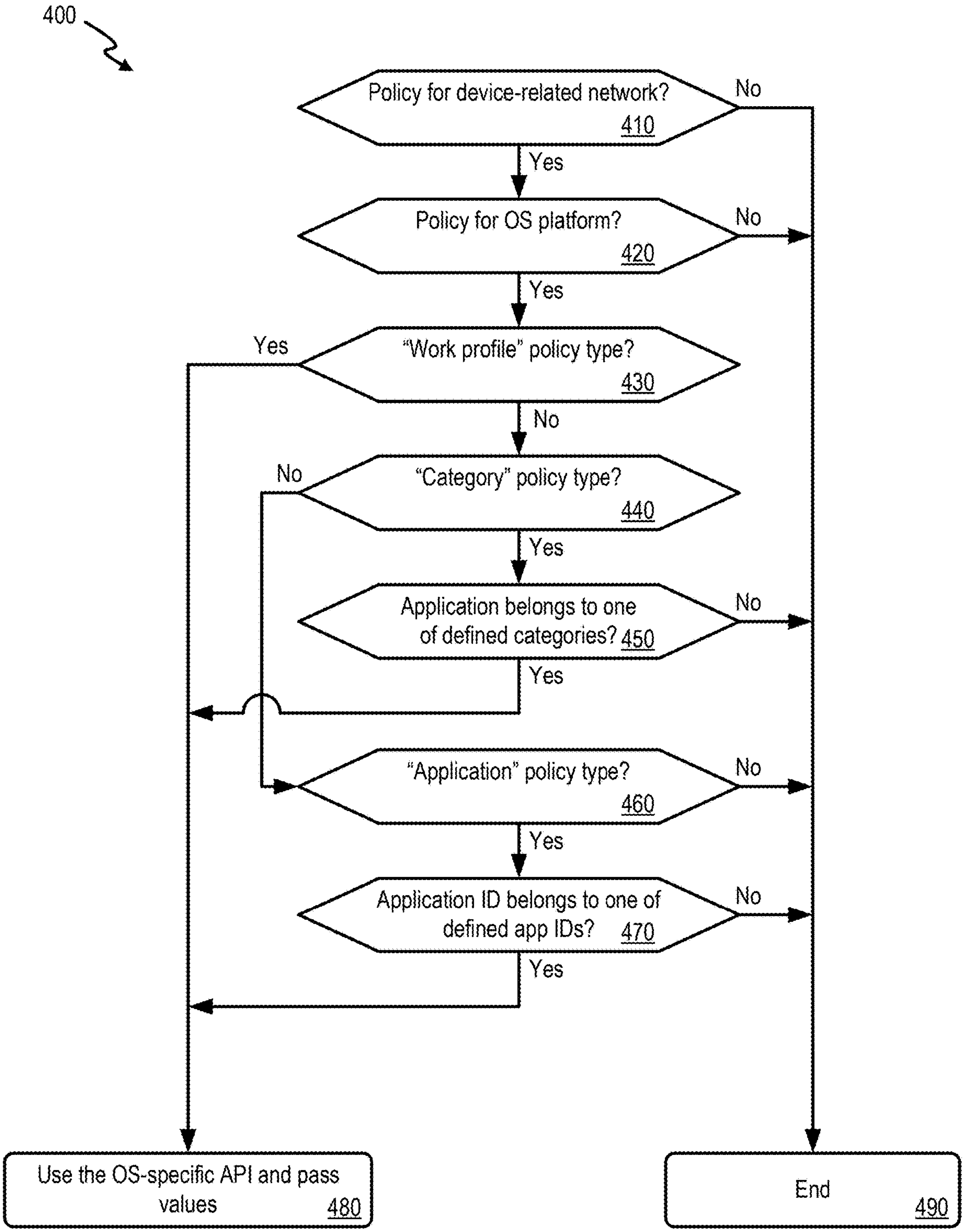
FIG. 4 is a flow diagram of a process associated with enforcing network slice selection using a slicing policy configuration file, according to an implementation.

FIG. 4 is a flowchart illustrating a logical workflow 400 for applying a slicing policy configuration file. Workflow 400 may be implemented by MDM system 170 and/or a corresponding MDM agent of UE device 162, for example, after slicing policy configuration file 215 is imported. More particularly, MDM system 170 may ensure that a network slice assignment for an application executed on a UE device 162 conforms to an enterprise subscription. Workflow 400 may receive a network slice assignment for an application and enforce, for example, a policy similar to the example of FIG. 3.

Workflow 400 may include determining if there is a policy for the device-related network (block 410). For example, MDM system 170 may review the MDN, the MCC and/or MNC for the device to confirm if there is a policy for a UE device 162 on provider network 110 (e.g., UE device 162 is authorized to access to provider network 110).

If there is a policy for the device-related network (block 410—Yes), workflow 400 may include determining if there is a policy for the OS platform (block 420). For example, MDM system 170 may review slicing policy configuration file 215 to determine if there is a policy corresponding to the OS used on UE device 162.

If there is a policy for the OS platform (block 420—Yes), workflow 400 may include determining if the policy type is a "work profile" policy (block 430). For example, MDM system 170 may review slicing policy configuration file 215 for a work profile entry in policy type field 350, which would apply to any application being executed by UE device 162.

If there is not a work profile policy type (block 430—No), workflow 400 may include determining if the policy type is a "category" policy (block 440). For example, MDM system 170 may review slicing policy configuration file 215 for a category entry in policy type field 350, which would apply to certain types of applications being executed by UE device 162.

If the policy type is a "category" policy (block 440—Yes), workflow 400 may include determining if the application type in the request matches one of the designated application types in the slicing policy configuration file (block 450). For example, MDM system 170 may review slicing policy configuration file 215 to determine if an application category in field 360 (e.g., "communications," "productivity") matches the application type for which a network slice is requested.

If the policy type is not a "category" policy (block 440—No), workflow 400 may include determining if the policy type is an "application" policy (block 460). For example, MDM system 170 may review slicing policy configuration file 215 for an application entry in policy type field 350, which would apply to a particular application being executed by UE device 162.

If the policy type is an "application" policy (block 460—Yes), workflow 400 may include determining if the application ID in the request matches one of the designated application identifiers in the slicing policy configuration file (block 470). For example, MDM system 170 may review slicing policy configuration file 215 to determine if an application ID in field 360 matches the application ID for which a network slice is requested.

If the policy type is a "work profile" policy (block 430—Yes), if the application type matches one of the designated application types (block 450—Yes), or if the application ID matches one of the designated application identifiers (block 470—Yes), workflow 400 may include assigning a network slice (block 480). For example, MDM system 170 may use the OS-specified API to pass on the traffic descriptor value from field 370 that the network maps to the specific slice type.

If there is no network policy (block 410—No), if there is no policy for the OS platform (block 420—No), if the application does not belong to a defined category (block 450—No), if the policy type is not an "application" policy (block 460—No), or if the application ID does not match one of the designated application identifiers (block 470—No), workflow 400 may end (block 490). For example, if none of the policy options apply to a particular network slice request, MDM system 170 may not apply a network slicing rule (e.g., allowing a default service level or network slice to be applied).

Figure 5:
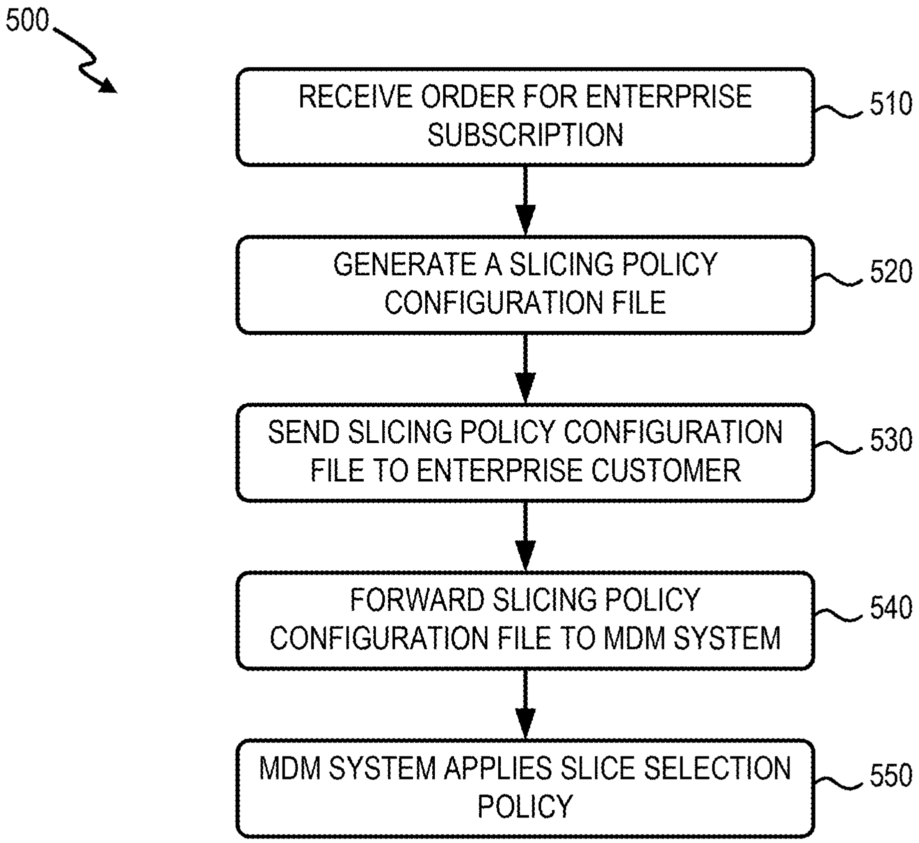
FIG. 5 is a flow diagram of a process for providing an assisted slice profile service, according to an implementation.

FIG. 5 is a flow diagram of a process 500 associated with providing an assisted slice profile service, according to an implementation. Process 500 may be performed by one or more network components, such as network services platform 140 and customer portal 150. As shown, process 500 may include receiving an order for an enterprise subscription (block 510). For example, in one implementation, enterprise network administrator may use customer portal 150 to provide user input (e.g., via user device 180) to select service attributes and/or service levels for UE devices 162. The service attributes may include, for example, terms of service for traffic associated with UE device 162, a selected application category, or a selected application (or application ID).

Process 500 may also include generating a slicing policy configuration file based on the order (block 520). For example, user input to customer portal 150 may be transferred to network services platform 140 for generating a slicing policy configuration file 215. Slicing policy configuration file 215 may reflect slice attributes to support the subscription purchased by the enterprise customer on multiple UE devices 162. For example, network services platform 140 may generate one or more rules to enable MDM system 170 to assign a network slice based on a UE device 162 being associated with an enterprise, an application category, or an application identifier. In one implementation, the slicing policy configuration file 215 may include policy fields such as those illustrated in table 300, including applicable MDNs (e.g., field 310), an applicable OS platform (e.g., field 320), a network indicator (e.g., fields 330, 340), a policy type (e.g., field 350), and a slice identifier (e.g., field 370). In one implementation, the slicing policy configuration file 215 may be provided in a standardized format that can be exchanged from any MNO (e.g., provider network 110) to any MDM solution (e.g., MDM system 170).

Process 500 may further include sending the slicing policy configuration file to an enterprise customer (block 530) and forwarding the slicing policy configuration file to an MDM system (block 540). For example, customer portal 150 may forward the slicing policy configuration file 215 to user device 180. According to an implementation, slicing policy configuration file 215 may be provided as a downloaded file to user device 180. According to another implementation, slicing policy configuration file 215 may be an encrypted file. An enterprise administrator may forward slicing policy configuration file 215 to an MDM administrator and/or MDM system 170. According to another implementation, slicing policy configuration file 215 may be forwarded to or pulled by MDM system 170 via a dedicated interface for receiving slicing policy configuration file 215.

Process 500 may also include applying slice selection policy by the MDM system (block 550). For example, as described in connection with FIG. 4, MDM system 170 may apply the rules of slicing policy configuration file 215 to associate network slices with applications/traffic for UE devices 162. In one implementation, MDM system 170 may forward applicable rules to an MDM agent of each UE device 162 to enforce network slice selection by each UE device 162.

Figure 6:
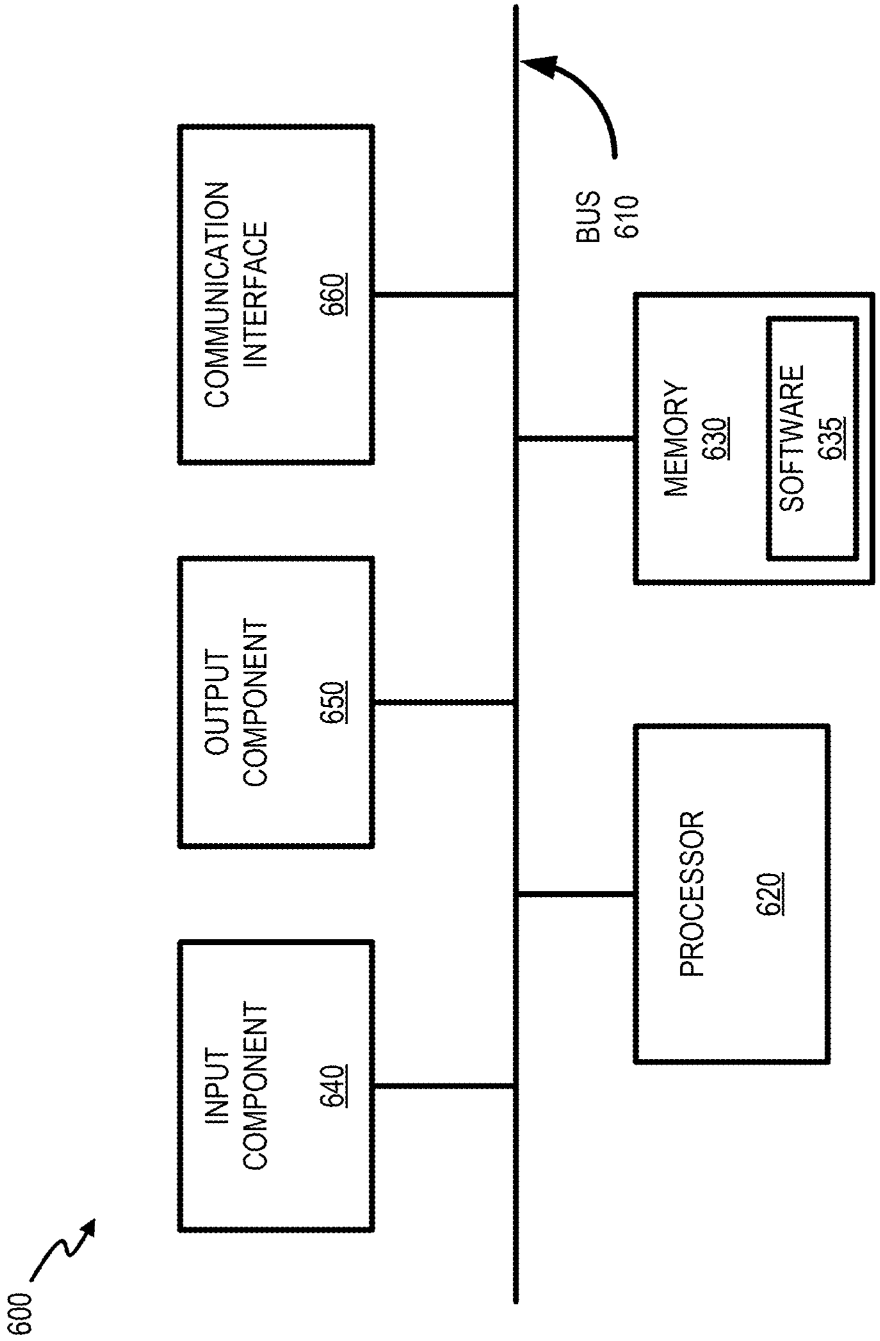
FIG. 6 depicts exemplary components of an exemplary network device.

FIG. 6 is a diagram illustrating exemplary components of a device 600. Device 600 may correspond to or include, for example, network devices 110, network services platform 140, UE device 162, MDM system 170, user device 180 or another component of network environment 100. Alternatively, or additionally, network devices 110, network services platform 140, UE device 162, MDM system 170, user device 180, or the other components of network environment 200 may include one or more devices 600 and/or one or more components of device 600. Device 600 may include a bus 610, a processor 620, a memory 630 with software 635, an input component 640, an output component 650, and a communication interface 660.

Bus 610 may include a path that permits communication among the components of device 600. Processor 620 may include any type of single-core processor, multi-core processor, microprocessor, latch-based processor, and/or processing logic (or families of processors, microprocessors, and/or processing logics) that interprets and executes instructions. For example, processor 620 may include one or more Central Processing Units (CPUs) and/or one or more Graphics Processing Units (GPU). In other embodiments, processor 620 may include an application-specific integrated circuit (ASIC), a field-programmable gate array (FPGA), and/or another type of integrated circuit or processing logic. Processor 620 may control operation of device 600 and its components.

Memory 630 may include any type of dynamic storage device that may store information and/or instructions, for execution by processor 620, and/or any type of non-volatile storage device that may store information for use by processor 620. For example, memory 630 may include a random access memory (RAM) or another type of dynamic storage device, a read-only memory (ROM) device or another type of static storage device, a content addressable memory (CAM), a magnetic and/or optical recording memory device and its corresponding drive (e.g., a hard disk drive, optical drive, etc.), and/or a removable form of memory, such as a flash memory.

Software 635 includes an application or a program that provides a function and/or a process. Software 635 may also include firmware, middleware, microcode, hardware description language (HDL), and/or other form of instruction. By way of example, with respect to the assisted slice profile service, functions of UE device 162 and MDM system 170 may include software 635 to enforce a network slice selection for designated applications.

Input component 640 may include a mechanism that permits a user to input information to device 600, such as a keyboard, a keypad, a button, a switch, etc. Output component 650 may include a mechanism that outputs information to the user, such as a display, a speaker, one or more light emitting diodes (LEDs), etc.

Communication interface 660 may include a transceiver that enables device 600 to communicate with other devices and/or systems via wireless communications (e.g., radio frequency (RF), infrared, and/or visual optics, etc.), wired communications (e.g., conductive wire, twisted pair cable, coaxial cable, transmission line, fiber optic cable, and/or waveguide, etc.), or a combination of wireless and wired communications. Communication interface 660 may include a transmitter that converts baseband signals to RF signals and/or a receiver that converts RF signals to baseband signals. Communication interface 660 may be coupled to an antenna for transmitting and receiving RF signals. For example, if device 600 is included in UE device 110, communication interface 660 may include an antenna assembly that includes one or more antennas to transmit and/or receive RF signals.

Communication interface 660 may include a logical component that includes input and/or output ports, input and/or output systems, and/or other input and output components that facilitate the transmission of data to other devices. For example, communication interface 660 may include a network interface card (e.g., Ethernet card) for wired communications and/or a wireless network interface (e.g., a Wi-Fi) card for wireless communications. Communication interface 660 may also include a universal serial bus (USB) port for communications over a cable, a Bluetooth™ wireless interface or an interface for another type of short range (e.g., less than 100 meters) wireless communication method, a radio-frequency identification (RFID) interface, a near-field communications (NFC) wireless interface, a Global Positioning System (GPS) receiver to obtain location information from GPS satellites, an optical transceiver, and/or any other type of interface that converts data from one form to another form.

As described above, device 600 may perform certain operations relating to graphical network design and configuration tools. Device 600 may perform these operations in response to processor 620 executing software instructions (e.g., software 635) contained in a computer-readable storage medium, such as memory 630. A computer-readable storage medium may be defined as a non-transitory memory device. A memory device may be implemented within a single physical memory device or spread across multiple physical memory devices. The software instructions may be read into memory 630 from another computer-readable medium or from another device. The software instructions contained in memory 630 may cause processor 620 to perform processes described herein. Alternatively, hardwired circuitry may be used in place of, or in combination with, software instructions to implement processes described herein. Thus, implementations described herein are not limited to any specific combination of hardware circuitry and software.

Although FIG. 6 shows exemplary components of device 600, in other implementations, device 600 may include fewer components, different components, additional components, or differently arranged components than depicted in FIG. 6. Additionally, or alternatively, one or more components of device 600 may perform one or more tasks described as being performed by one or more other components of device 600.

Systems and methods described herein provide an assisted slice profile service. A network device receives an order for an enterprise subscription. The network device generates, based on the order, a slicing policy configuration file for UE devices associated with the enterprise subscription. The network device sends the slicing policy configuration file to an enterprise customer for eventual importation and enforcement by an MDM system.

The foregoing description of implementations provides illustration but is not intended to be exhaustive or to limit the invention to the precise form disclosed. Modifications and variations are possible in light of the above teachings or may be acquired from practice of the invention. Also, while a series of blocks have been described with regard to FIGS. 4 and 5 the order of the blocks and message/operation flows may be modified in other embodiments. Further, non-dependent blocks may be performed in parallel.

Certain features described above may be implemented as "logic" or a "unit" that performs one or more functions. This logic or unit may include hardware, such as one or more processors, microprocessors, application specific integrated circuits, or field programmable gate arrays, software, or a combination of hardware and software.

To the extent the aforementioned embodiments collect, store or employ personal information of individuals, it should be understood that such information shall be collected, stored and used in accordance with all applicable laws concerning protection of personal information. Additionally, the collection, storage and use of such information may be subject to consent of the individual to such activity, for example, through well known "opt-in" or "opt-out" processes as may be appropriate for the situation and type of information. Storage and use of personal information may be in an appropriately secure manner reflective of the type of information, for example, through various encryption and anonymization techniques for particularly sensitive information.

Use of ordinal terms such as "first," "second," "third," etc., in the claims to modify a claim element does not by itself connote any priority, precedence, or order of one claim element over another, the temporal order in which acts of a method are performed, the temporal order in which instructions executed by a device are performed, etc., but are used merely as labels to distinguish one claim element having a certain name from another element having a same name (but for use of the ordinal term) to distinguish the claim elements.

No element, act, or instruction used in the description of the present application should be construed as critical or essential to the invention unless explicitly described as such. Also, as used herein, the article "a" is intended to include one or more items. Further, the phrase "based on" is intended to mean "based, at least in part, on" unless explicitly stated otherwise.

In the preceding specification, various preferred embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense.

What is claimed is:

1. A system comprising:

a first network device including a first processor configured to:

receive an order for an enterprise subscription;

generate, based on the order, a slicing policy configuration file for multiple user equipment (UE) devices associated with the enterprise subscription, wherein the slicing policy configuration file includes one or more rules for a Mobile Device Management (MDM) system to assign a network slice based on an association with one of an enterprise, an application category, or an application identifier; and send the slicing policy configuration file to an enterprise, associated with the enterprise subscription, in a format that can be transferred to the MDM system.

2. The system of claim 1, further comprising:

a second network device including a second processor configured to:

receive, from the enterprise, the slicing policy configuration file; and enforce network slice assignments for the multiple UE devices associated with the enterprise subscription, based on the slicing policy configuration file.

3. The system of claim 2, wherein the second network device includes an MDM server.

4. The system of claim 2, wherein, when receiving the slicing policy configuration file, the second processor is further configured to:

receive the slicing policy configuration file via a dedicated interface.

5. The system of claim 1, wherein, when receiving the order for the enterprise subscription, the first processor is further configured to:

receive, from the enterprise, terms for a Service Level Agreement (SLA)-based prioritized service for an application executed on the multiple UE devices.

6. The system of claim 1, wherein the slicing profile configuration file includes a standardized format that can be understood by multiple MDM systems.

7. The system of claim 1, wherein, when generating the slicing policy configuration file, the first processor is further configured to:

generate a rule based on a Mobile Country Code (MCC), a Mobile Network Code (MNC), and operating system (OS) of the multiple UE devices associated with the enterprise subscription.

8. The system of claim 1, wherein, when generating the slicing policy configuration file, the first processor is further configured to:

generate a rule based on one of the application category or the application identifier.

9. The system of claim 1, wherein a network slice identifier of the network slice includes a value that is specific to an operating system (OS) platform and maps to a type of network slice.

10. A method comprising:

receiving, by a first network device that includes one or more first processors, an order for an enterprise subscription;

generating, by the first network device and based on the order, a slicing policy configuration file for multiple user equipment (UE) devices associated with the enterprise subscription, wherein the slicing policy configuration file includes one or more rules for a Mobile Device Management (MDM) system to assign a network slice based on an association with one of an enterprise, an application category, or an application identifier; and sending, by the first network device, the slicing policy configuration file to an enterprise, associated with the enterprise subscription, in a format that can be transferred to the MDM system.

11. The method of claim 10, further comprising:

receiving, by a second network device that include one or more second processors and from the enterprise, the slicing policy configuration file; and enforcing, by the second network device, network slice assignments for the multiple UE devices associated with the enterprise subscription, based on the slicing policy configuration file.

12. The method of claim 11, wherein the second network device is part of the MDM system.

13. The method of claim 10, wherein receiving the order for the enterprise subscription, further comprises:

receiving, from the enterprise, user input for terms of a Service Level Agreement (SLA)-based prioritized service for an application executed on the multiple UE devices.

14. The method of claim 10, wherein the slicing profile configuration file includes one or more rules for the MDM system to associate an application, executed on the multiple UE devices, with a network slice identifier.

15. The method of claim 10, wherein the slicing profile configuration file includes a rule to assign a network slice based on a Mobile Country Code (MCC), a Mobile Network Code (MNC), and operating system (OS) of the multiple UE devices associated with the enterprise subscription.

16. The method of claim 15, wherein the slicing profile configuration file includes a rule to assign the network slice based on one of an application category or an application identifier.

17. A non-transitory computer-readable medium containing instructions executable by at least one processor of a network device, the non-transitory computer-readable medium comprising instructions for:

receiving, by the network device, an order for an enterprise subscription;

generating, by the network device and based on the order, a slicing policy configuration file for multiple user equipment (UE) devices associated with the enterprise subscription; and sending, by the network device, the slicing policy configuration file to an enterprise customer, associated with the enterprise subscription, in a format that can be transferred to a Mobile Device Management (MDM) system, wherein the instructions for generating a slicing policy configuration file include instructions for generating one or more rules for the MDM system to assign a network slice based on an association with one of an enterprise, an application category, or an application identifier.

18. The non-transitory computer-readable medium of claim 17, wherein the instructions for receiving the order further include instructions for:

receiving, from the enterprise customer, user input for terms of a Service Level Agreement (SLA)-based prioritized service for an application executed on the multiple UE devices.

19. The non-transitory computer-readable medium of claim 17, wherein the instructions for generating a slicing policy configuration file include instructions for:

generating one or more rules for the MDM system to associate an application, executed on the multiple UE devices, with a network slice identifier of the network slice.

20. The non-transitory computer-readable medium of claim 17, wherein the instructions for generating a slicing policy configuration file include instructions for:

generating-the slicing policy configuration file in a standardized format that can be understood by multiple MDM systems.

* * * * *